United States Patent
Lake

(10) Patent No.: US 7,340,493 B2
(45) Date of Patent: Mar. 4, 2008

(54) SYSTEM AND METHOD FOR REDUCING MEMORY LEAKS IN VIRTUAL MACHINE PROGRAMS

(75) Inventor: John M. Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 10/612,802

(22) Filed: Jul. 2, 2003

(65) Prior Publication Data

US 2005/0004884 A1    Jan. 6, 2005

(51) Int. Cl.
*G06F 17/00* (2006.01)
(52) U.S. Cl. ............ 707/206; 707/200
(58) Field of Classification Search ............ 707/1, 707/203, 205–206
See application file for complete search history.

(56) References Cited

U.S. PATENT DOCUMENTS

| | | | | |
|---|---|---|---|---|
| 5,842,019 A * | 11/1998 | Kolawa et al. | | 717/130 |
| 5,848,423 A | 12/1998 | Ebrahim et al. | | 707/206 |
| 5,893,121 A | 4/1999 | Ebrahim et al. | | 707/206 |
| 5,940,621 A | 8/1999 | Caldwell | | 395/709 |
| 6,081,665 A | 6/2000 | Nilsen et al. | | 395/705 |
| 6,093,216 A | 7/2000 | Adl-Tabatabai et al. | | 717/3 |
| 6,094,664 A | 7/2000 | Ungar | | 707/206 |
| 6,151,703 A * | 11/2000 | Crelier | | 717/136 |
| 6,308,315 B1 * | 10/2001 | Dice et al. | | 717/106 |
| 6,317,869 B1 * | 11/2001 | Adl-Tabatabai et al. | | 717/132 |
| 6,327,701 B2 | 12/2001 | Ungar | | 717/5 |
| 6,353,838 B2 | 3/2002 | Sauntry et al. | | 707/206 |
| 6,415,433 B1 * | 7/2002 | Callahan et al. | | 717/160 |
| 6,487,563 B1 | 11/2002 | Houldsworth | | 707/206 |
| 6,725,241 B1 * | 4/2004 | Rodriguez et al. | | 707/203 |
| 6,898,602 B2 * | 5/2005 | Sayag | | 707/206 |
| 2001/0013117 A1 * | 8/2001 | Ungar | | 717/5 |
| 2001/0044856 A1 | 11/2001 | Agesen et al. | | 709/315 |
| 2004/0210577 A1 * | 10/2004 | Kundu et al. | | 707/8 |

* cited by examiner

*Primary Examiner*—Don Wong
*Assistant Examiner*—Linh Black
(74) *Attorney, Agent, or Firm*—Van Leeuwen & Van Leeuwen; Andre M. Gibbs

(57) ABSTRACT

A system and method is provided for reducing memory leaks in virtual machine programs, such as those encountered in programs running in the Java Virtual Machine (JVM) environment. A compiler, such as a Java Just-In-Time (JIT) compiler, is used to identify the last use of an variable and, subsequent to the program statement where the last use occurs, insert a nullification statement. The nullification statement nullifies the variable so that it no longer references an object stored in a garbage collected heap. Variables in a program are identified in the activation records of the program. The nullification statement, when executed, severs the link between the program and the objects stored in the garbage-collected heap so that the program is no longer seen as a "root" for the object, often enabling the garbage collector to reclaim memory occupied by the object sooner.

4 Claims, 5 Drawing Sheets

SYSTEM AND METHOD FOR REDUCING MEMORY LEAKS IN VIRTUAL MACHINE PROGRAMS

BACKGROUND OF THE INVENTION

1. Technical Field

The present invention relates in general to a system and method for reducing memory leaks in virtual machine programs. More specifically, the present invention relates to a system and method for using a compiler to add nullification statements in a program.

2. Description of the Related Art

Middleware environments, such as that provided by a Java Virtual Machine (JVM), often use a heap to store objects created in the environment. The heap stores objects created by an application running in the middleware environment. Garbage collection is the process of automatically freeing objects from the heap that are no longer needed by the application. This reduces the burden of memory management placed on the programmer.

However, garbage collection is not a panacea. Long running middleware applications remain susceptible to failures induced by "memory leaks." A memory leak is a term used to describe error conditions that arise when programs allocate memory that is not reclaimed. As described above, garbage collection reclaims memory after the last reference to the memory is no longer "reachable" from a known set of "roots," wherein the roots include things such as processor registers and memory locations containing references to heap objects, such as those used to hold the program stacks. Consequently, garbage collection may leave objects in the heap that are irrelevant (i.e., no longer needed) to the future of the computation but are still reachable from at least one object.

Some of these reachable but irrelevant objects arise from local variables that exist in the activation records of a program. The activation record includes variables (i.e., objects references) that are passed to a procedure from another procedure or routine as well as local variables that are declared within the program. These procedures may be long-lived and include memory hungry processing. Therefore, freeing objects that are no longer used is often vital to avoiding memory problems.

One approach to freeing objects is for the programmer to explicitly nullify a variable that will no longer be used in the program. A first challenge to this approach is that it nullifies the benefits of using garbage collection, as the programmer is forced to consider memory management issues even when such considerations may not be necessary. This is not a common practice with programmers of middleware applications, except when memory problems arise. A second challenge is completeness. Namely, identifying all nullifiable variables may be difficult and time consuming for a programmer. A third challenge is correctness: when attempting to nullify the variables, the programmer may introduce errors by prematurely nullifying a variable.

A fourth challenge regards single-assignment semantics. More specifically, a programmer may use variables and parameters with single-assignment semantics, such as using the "const" keyword in the C programming language, or using the "final" attribute in a Java program. Single-assignment semantics are used to prevent certain types of programming errors as well as to communicate a variable's use clearly to other programmers and the compiler. A programmer desiring to use single-assignment cannot use nullification, as the nullification statement will be seen by the compiler as a second assignment, violating the single-assignment semantic. The programmer must therefore choose, for every variable, whether to use single-assignment or variable nullification, thus losing the benefits of using both techniques simultaneously.

Another challenge is that a compiler may actually be responsible for setting up a variable to reference an object as well as including the variable in the activation record of a program. In such situations, the programmer would not know the name of the variable or object being passed as a result of the compiler and, therefore, would not be able to include a statement nullifying the object or variable after it is no longer used.

FIG. 1 is a prior art diagram showing how prior art compilers, including Just-in-Time (JIT) compilers, do not nullify variables after the last use of such variables. Garbage collector 100 is a process (i.e., a software routine) that reclaims memory from heap 110. When invoked, garbage collector 100 determines which objects residing in the heap are no longer accessible ("reachable") from other objects ("roots"), such as the program stack 125. Program stack 125 includes a start of the procedure 130, often identified by a left brace ({). The program stack includes activation records 140 that include parameters that are passed to the program as well as locally declared variables 150. Variables included in the activation records refer to objects that are stored in memory that is included in heap 110. Program stack 125 also includes statements that use objects and variables 160. Such statements may retrieve data from objects and variables, store data in the objects and variables, or use the objects and variables in computations or to call other programs or procedures.

At various points in the program, a last use of a variable that references an object is made. One of these points is statement 170. While only one point is shown in program stack 125, it will be understood by those skilled in the art that many such points may exist in a given program when particular variables are no longer used (i.e., some variables may no longer be used while other variables continue to be used). Even though the variables are no longer used, program stack 125 continues to reference the unused variables. The continued reference by such variables to such no-longer-used objects results in garbage collector 100 maintaining (i.e., not removing) the memory used by the no-longer-used objects within heap 110, notwithstanding the fact that there may be no objects needing the objects and variables. In the example shown, program stack 125 performs memory hungry computation 180. Even if the middleware environment, such as a Java Virtual Machine, needs additional memory to perform the computation, it is unable to identify the no-longer-used objects as "garbage" until after the computation is performed (i.e., at the end of the procedure 190 which is often identified with a closing brace (})).

What is needed, therefore, is a system and method for automatically nullifying variables that are no longer used by a program. What is further needed is a modification of the compiler to automatically nullify variables both referenced by the programmer as well as those included by the compiler.

SUMMARY

It has been discovered that the aforementioned challenges are resolved using a system and method that nullifies variables after they are no longer used. Once the variables are nullified, the space occupied by the objects that they formerly referenced in the heap can be reclaimed, if needed, by a garbage collection routine. Without nullifying the variables, the garbage collection routine must assume that the program is still using the objects and may not reclaim the space.

Before program execution, objects and variables to be included in activation records are compared with program statements to determine the last usage of such objects and variables. When an object or variable is last used in the program, a statement is automatically included in the program code nullifying the variable. In one embodiment, nullifying the variable is performed by setting the address of the referenced object to "null" (e.g., "object1=null;"). Setting the object or variable to null destroys the reference of the program to the object residing in the heap. If that variable held the last reference to the object, then, after the program's reference to the object or variable has been nullified, the garbage collector is free to reclaim the memory used to store the object in the heap.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
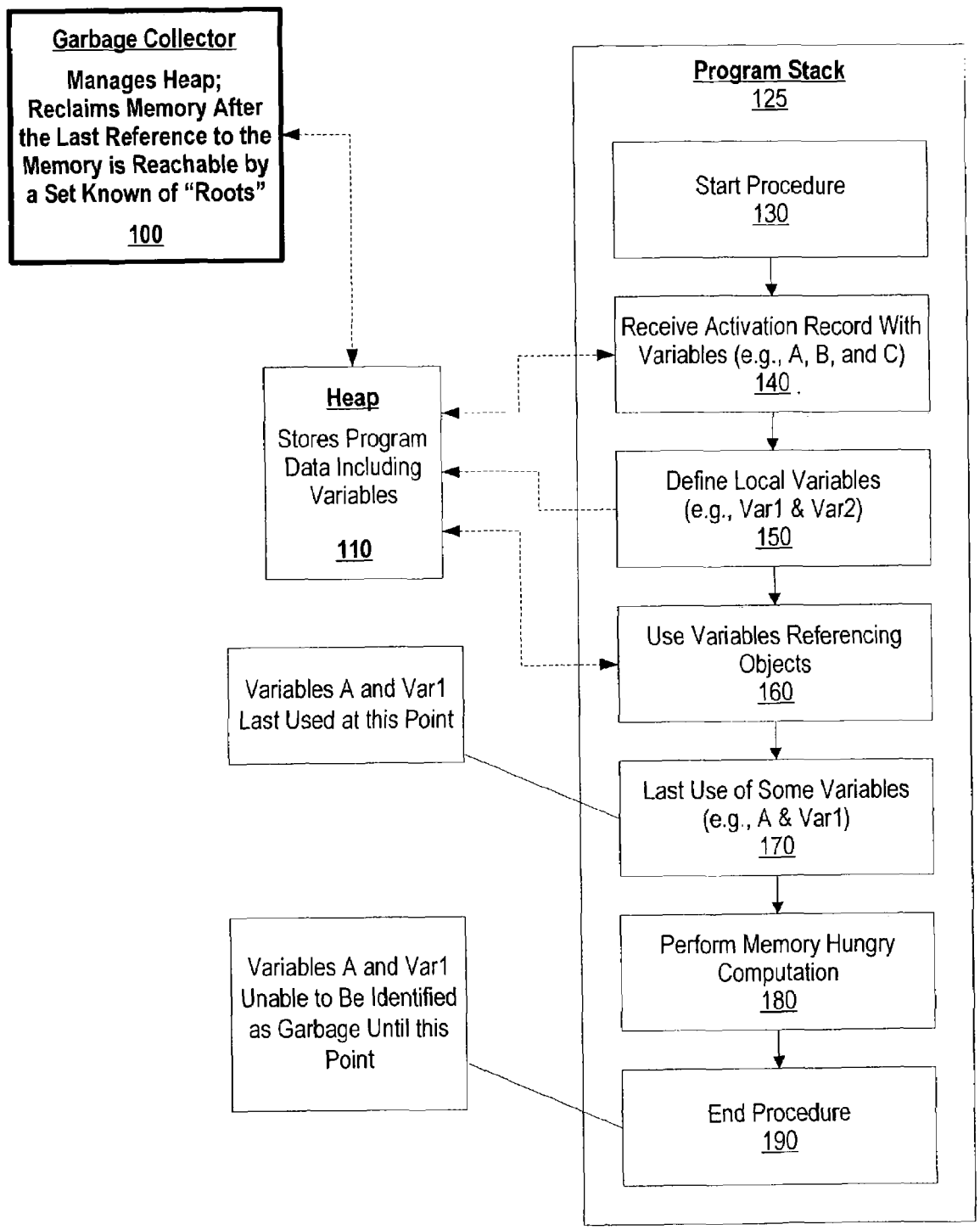
FIG. 1 is a prior art diagram showing how prior art compilers do not nullify variables and objects after the last use of such variables and objects.

FIG. 1 is a prior art diagram showing how prior art compilers do not nullify variables and objects after the last use of such variables and objects. For details concerning this diagram, see the "background" section, above.

Figure 2:
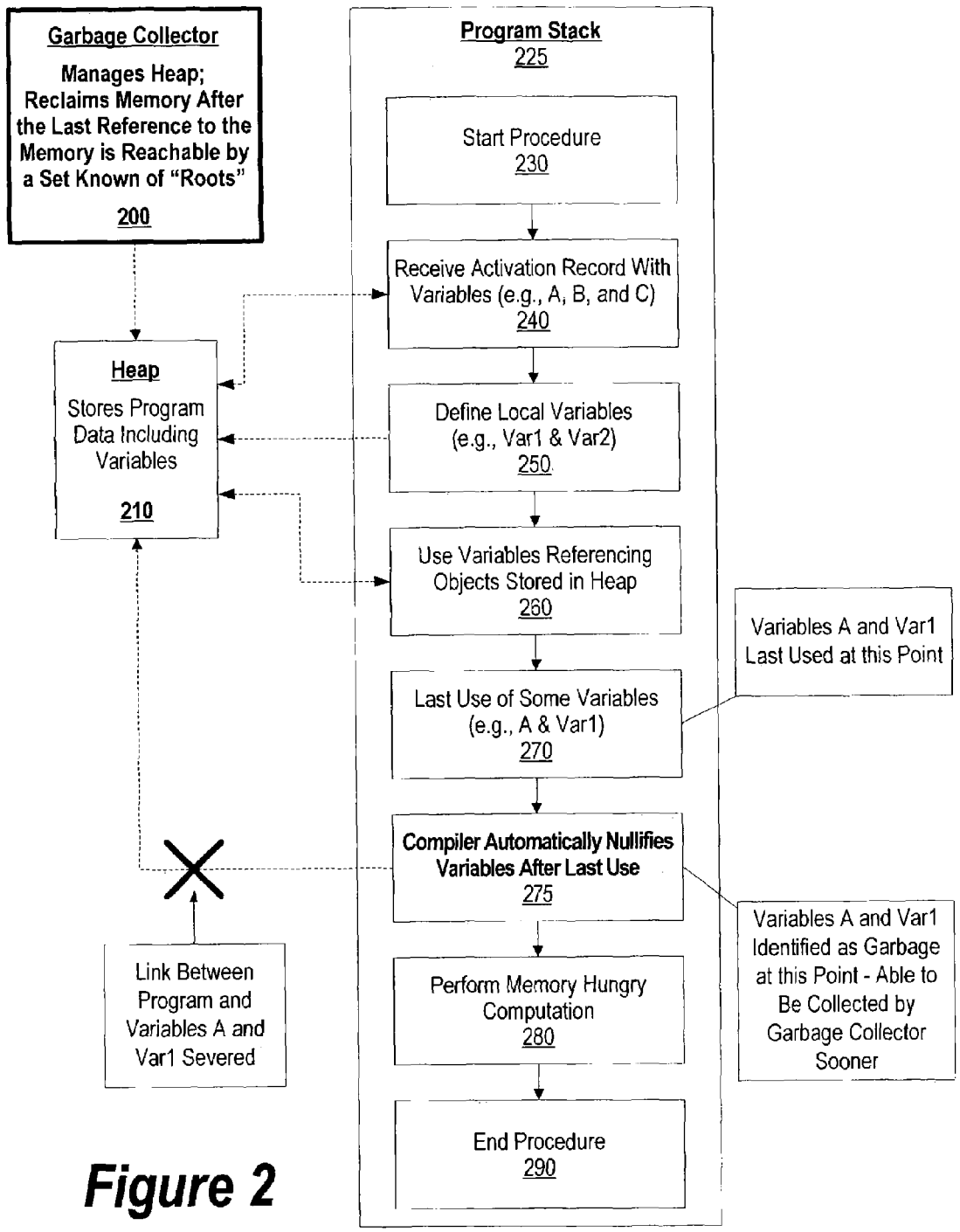
FIG. 2 is a diagram showing the nullification of variables and objects using a compiler.

FIG. 2 is a diagram showing the nullification of variables that reference objects stored in a garbage collected heap. The components used and processing shown in FIG. 2 are similar to those shown in FIG. 1, however in FIG. 2 variables are nullified by the compiler so that the memory they use in the heap might be reclaimed by the garbage collector.

Garbage collector 200 is a process (i.e., a software routine) that reclaims memory occupied by objects that are stored in heap 210. When invoked, garbage collector 200 determines which objects residing in the heap are no longer accessible ("reachable") from other objects ("roots"), such as program stack 225. Program stack 225 includes a start of the procedure 230, often identified by a left brace ({). The program stack includes activation records 240 that include parameters that are passed to the program as well as locally declared variables 250. Some of the variables included in the activation records reference objects that are stored in garbage collected heap 210. Program stack 225 also includes statements that use objects and variables 260. Such statements may retrieve data from objects, store data in the objects, or call the objects to perform computations or other functions.

At various points in the program, a last use of a variable that references an object is made. One of these points is statement 270. While only one point is shown in program stack 225, it will be understood by those skilled in the art that many such points may exist in a given program when particular variables are no longer used (i.e., some variables may no longer be used while other variables continue to be used). After a variable is last-used by the program, the compiler inserts nullification statement 275 into the compiled program. In this manner, after the nullification statement, program stack 225 no longer references the objects that are no longer used by the program. The removal of the reference to the no-longer-used objects results in garbage collector 200 being able to remove the memory used by the no-longer-used objects from heap 210, if there are no other programs needing the objects and variables. In the example shown, program stack 225 performs memory hungry computation 280. If the middleware environment, such as a Java Virtual Machine, needs additional memory to perform the computation, it is possible that garbage collector 200 will be able to identify the no-longer-used objects as "garbage" before the computation is performed, thus freeing memory in the heap that might be needed by the memory hungry computation. Nullification statements are inserted by the compiler into program stack 225 at appropriate points between the activation records and the end of the program 290, which is often indicated by a closing brace (}).

Figure 3:
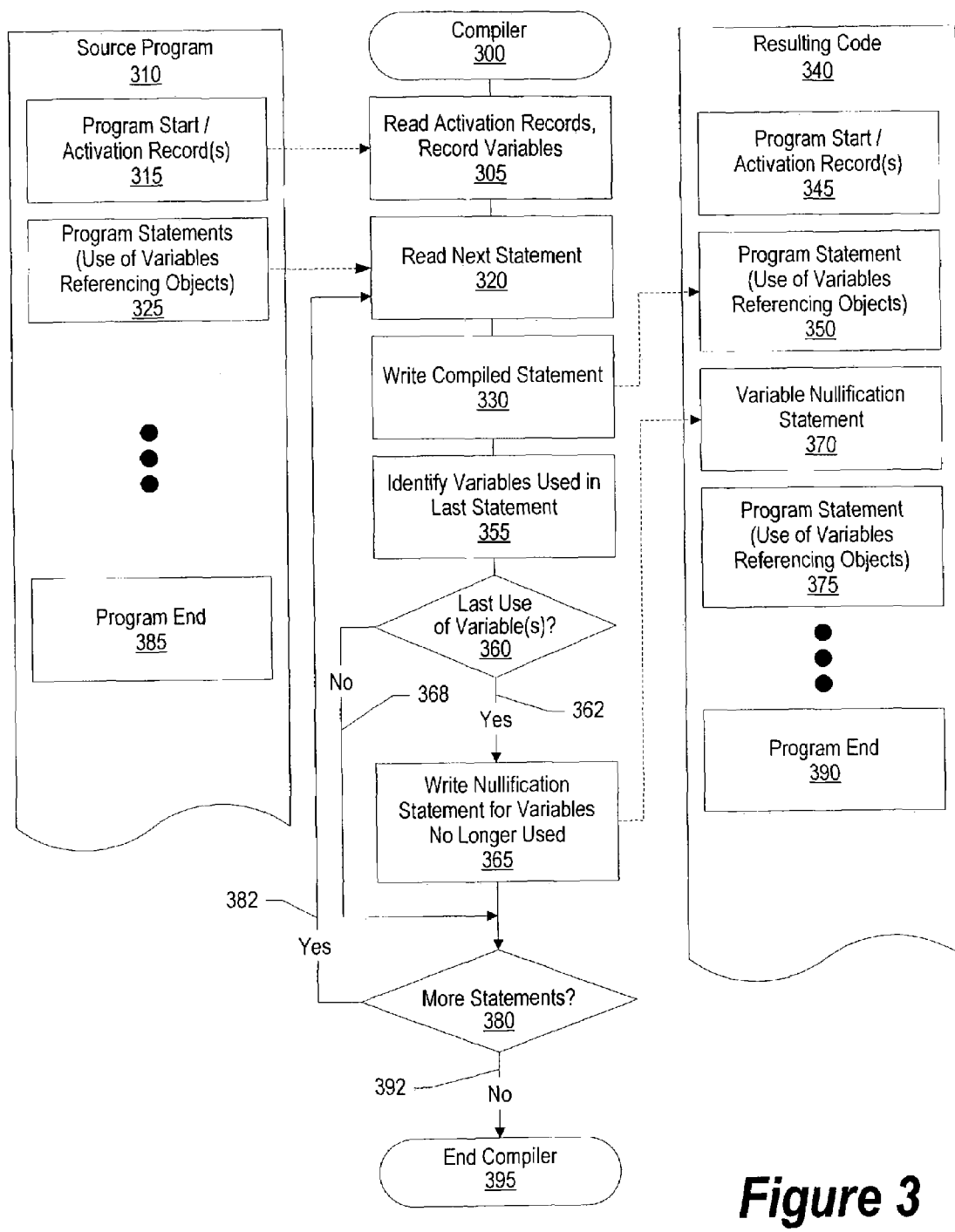
FIG. 3 is a flowchart showing additional steps taken by a compiler to add nullification statements to a JIT-compiled program.

FIG. 3 is a flowchart showing additional steps taken by a compiler, such as a Java "Just-in-Time" ("JIT") compiler, to add nullification statements to a compiled program. Those skilled in the art will realize that the compiler performs more functions than shown in FIG. 3 and that FIG. 3 focuses on the processing added to the compiler to add nullification statements to a program.

Compiler processing commences at 300 whereupon, at step 305, the compiler reads activation records 315 from source program 310. Those skilled in the art will appreciate that source program 310 may be a program written by a programmer as well as a program that has had activation records inserted in the program by the compiler. The compiler records the variables that are included in the activation records.

The compiler reads, at step 320, program statement 325 included in source program 310. Program statements included in source program 310 may use include variables that were identified in the activation records, and these variables may reference objects stored in the heap. The compiler performs compilation steps on the statement and, at step 330, writes the resulting compiled statement to resulting code 340 as program statement 350.

The compiler then identifies, at step 355, variables used in the most recently read program statement that are not used in subsequent statements found in source program 310. A determination is made as to whether the most recently read program statement is the "last use" of any of the variables (decision 360). If the statement is the "last use" of any such variables, decision 360 branches to "yes" branch 362 whereupon, at step 365, nullification statement 370 is written for those variables that are no longer used. An example, in the Java programming language, of a nullification statement that nullifies variable "Var1" that previously referenced object "ObjA" is "Var1=null;"—the effect of this statement is to set the address of the object referenced by Var1 to a "null" value (i.e., no address) which severs the program's connection to the actual object ("Obj1") stored in the heap. When garbage collection occurs, the program will no longer be seen as a "root" of the object. If there are no other "roots" of the object, then the garbage collector is free to remove the object from the heap and reclaim the memory that it occupied.

On the other hand, if the statement is not the "last use" of any of the variables, then decision 360 branches to "no" branch 368 bypassing step 365.

A determination is made as to whether there are more statements to process in source program 310 (decision 380). If there are additional statements to process, decision 380 branches to "yes" branch 382 which loops back to read and process the next statement resulting in program statement 375 being written to resulting code 340. Throughout this looping, when a "last use" of one or more variables is encountered, a nullification statement is written to resulting code 340 for such statements. Eventually, program end statement 385 is read from source program 310, end statement 390 is written to resulting code 340, and decision 380 branches to "no" branch 392 whereupon compiler processing ends at 395.

Figure 4:
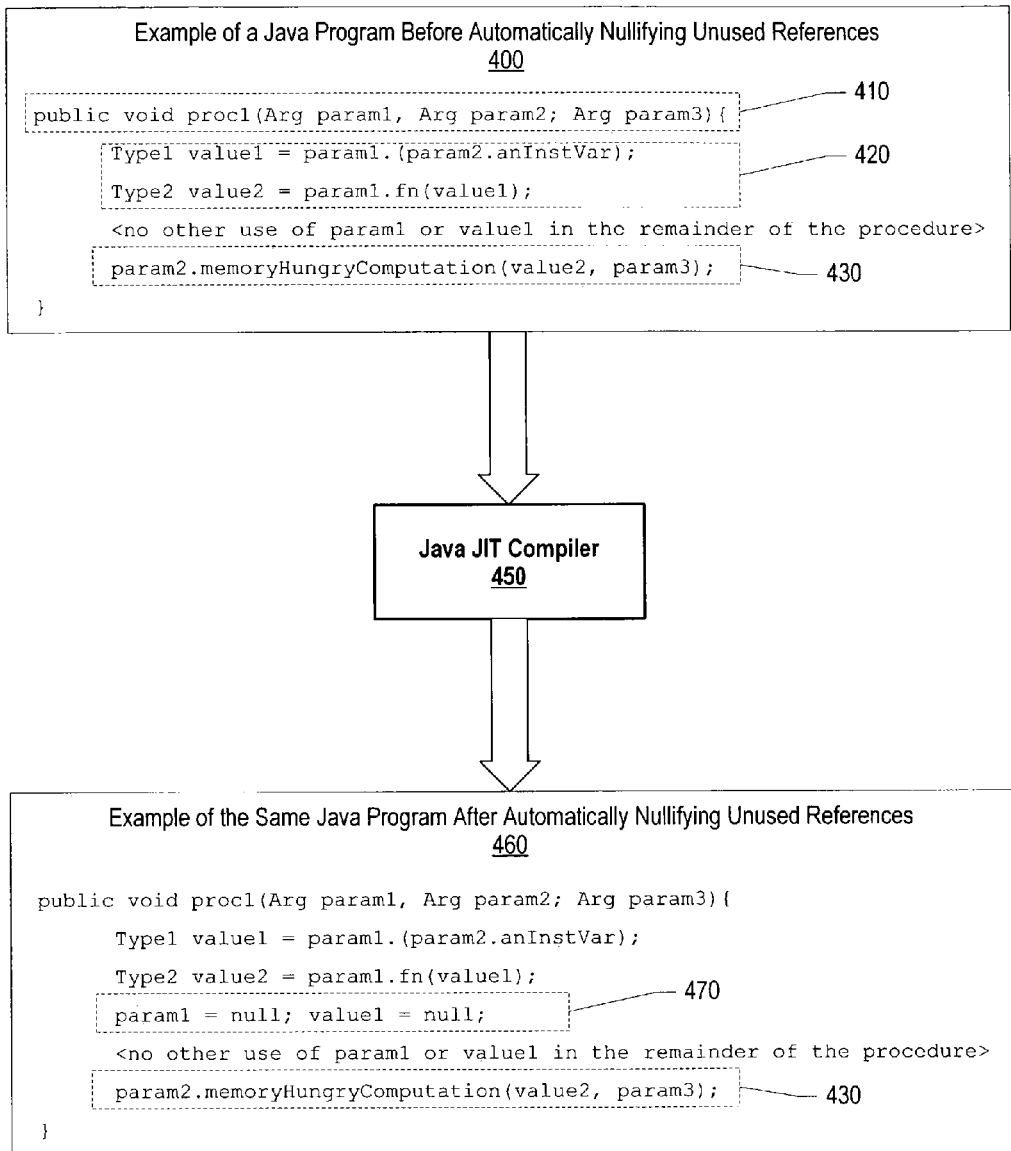
FIG. 4 is a JAVA example showing a nullification statement being added to a program by a Java Just-in-Time (JIT) compiler.

FIG. 4 is a Java example showing a nullification statement being added to a program by the Java Just-in-Time (JIT) compiler. Listing 400 includes the program statements that existed prior to processing the program using JIT compiler 450, the processing of which is described in detail in FIG. 3.

Listing 400 includes activation records 410 and 420. Activation record 410 is the argument statement passing arguments param1, param2, and param3 to the program. Activation record 420 shows the declaration of local variables value1 and value2. The comment indicates that no further use is made of param1 or value1 in the remainder of the program prior to the execution of statement 430. Statement 430 is shown to be a "memory hungry" computation which may need more memory than is currently free in the JVM heap, causing a garbage collection event to occur in order to free space for the computation.

Listing 460 shows the same listing as shown in listing 400 after JIT compiler 450 automatically inserted nullification statements. Listing 460 includes nullification statement 470 which nullifies param1 and value1 (i.e., sets their value (referenced address) to null indicating that the variable is no longer referencing an object in the heap). Now, when memory hungry computation statement 430 executes, if the garbage collector needs to locate additional memory for the computation then the memory previously occupied by the objects referenced by param1 and value1 may be able to be reclaimed (so long as no other program/object is currently a root for either object) providing additional memory for the execution of memory hungry computation 430.

Figure 5:
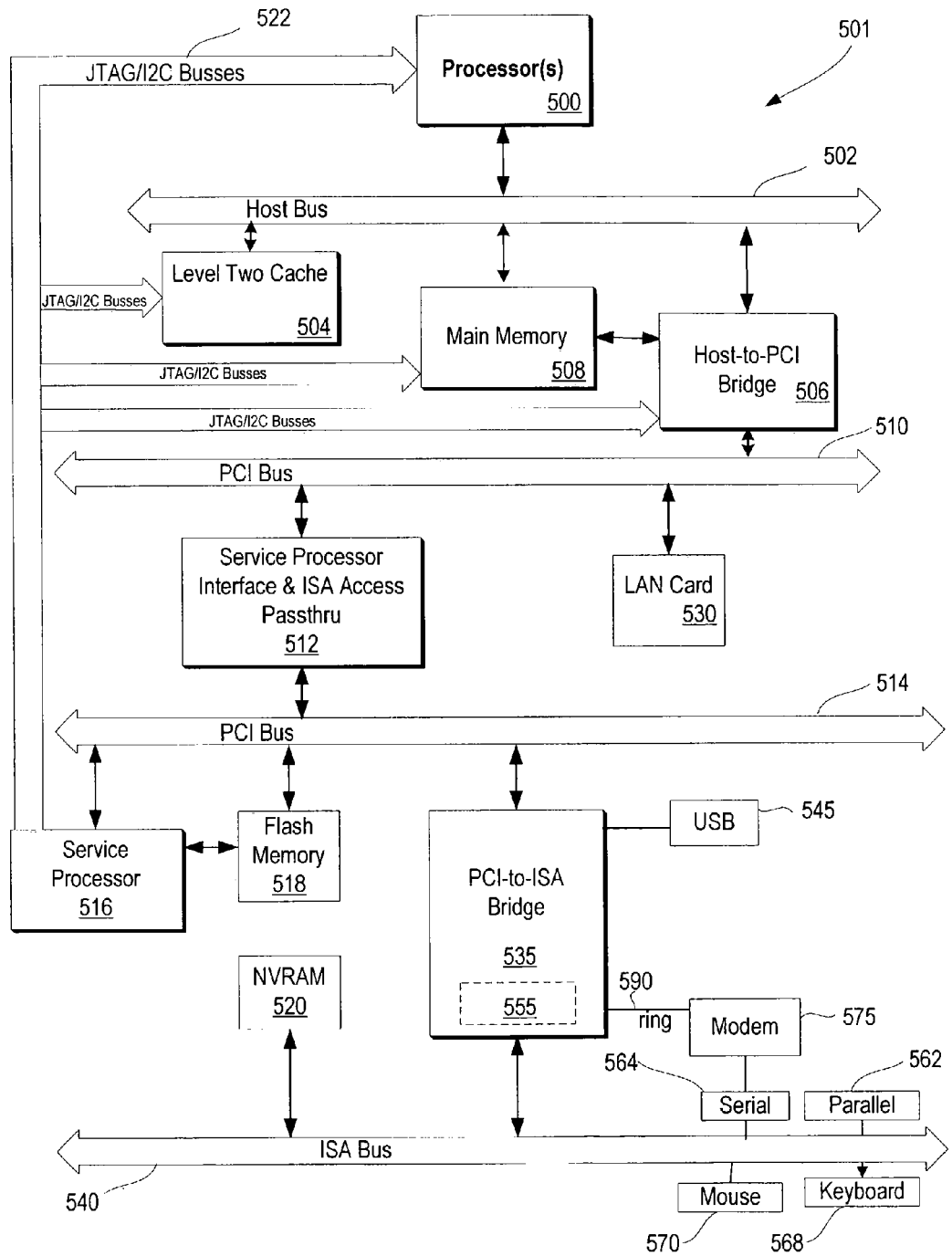
FIG. 5 is a block diagram of a computing device capable of implementing the present invention.

FIG. 5 illustrates information handling system 501 which is a simplified example of a computer system capable of performing the computing operations described herein. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method for automatically nullifying variables in a middleware computer program, said method comprising:

reading, by a just in time compiler, one or more variables included in one or more activation records included in the middleware computer program, wherein the variables reference one or more objects, the objects stored in a garbage collected heap stored in a computer memory;

identifying, by the just in time compiler, a program statement in the middleware computer program where a selected variable is last used;

inserting, by the just in time compiler, a nullification statement after the identified program statement, the nullification statement adapted to nullify the selected variable;

writing the activation records, the identified program statement, and the nullification statement to a resulting code file for the middleware computer program;

executing the middleware computer program, wherein the executing further comprises:

executing the nullification statement to nullify the selected variable; and after nullifying the selected variable, executing a garbage collection program, wherein executing the garbage collection program comprises identifying one of the objects that was previously referenced by the selected variable, and reclaiming the memory occupied by the identified object.

2. The method of claim 1 wherein the activation records include one or more local variable definitions.

3. The method of claim 1 wherein the activation records include one or more argument parameters.

4. The method of claim 1 further comprising:

identifying one or more program statements from the plurality of program statements where one or more other variables are last used; and writing nullification statements for each of the other variables following the identified program statement corresponding to the variable's last use to the resulting code file.

* * * * *